United States Patent
Iwahashi et al.

(10) Patent No.: US 11,217,278 B2
(45) Date of Patent: Jan. 4, 2022

(54) TAPE CARTRIDGE INCLUDING REEL LOCK MEMBER

(71) Applicant: Sony Corporation, Tokyo (JP)

(72) Inventors: Yuji Iwahashi, Miyagi (JP); Takeshi Saito, Miyagi (JP); Hiroshi Kumagai, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/961,438

(22) PCT Filed: Nov. 1, 2019

(86) PCT No.: PCT/JP2019/043011
§ 371 (c)(1),
(2) Date: Jul. 10, 2020

(87) PCT Pub. No.: WO2020/100629
PCT Pub. Date: May 22, 2020

(65) Prior Publication Data
US 2021/0264945 A1    Aug. 26, 2021

(30) Foreign Application Priority Data

Nov. 15, 2018 (JP) .............................. JP2018-214510

(51) Int. Cl.
*G11B 5/78* (2006.01)
*G11B 23/03* (2006.01)
(Continued)

(52) U.S. Cl.
CPC .............. *G11B 5/78* (2013.01); *G11B 23/027* (2013.01); *G11B 23/0306* (2013.01); *G11B 23/037* (2013.01); *H01Q 1/24* (2013.01)

(58) Field of Classification Search
CPC ...... G06K 19/04; G06K 19/07; G06K 19/077; G11B 20/1201; G11B 5/00817;
(Continued)

(56) References Cited

U.S. PATENT DOCUMENTS

| 6,113,020 A | * | 9/2000 | Nayak ..................... G11B 15/32 242/338.1 |
| 6,318,657 B1 | * | 11/2001 | Nayak ..................... G11B 15/32 242/338.1 |

(Continued)

FOREIGN PATENT DOCUMENTS

| JP | 2002-352551 | 12/2002 |
| JP | 2002-352551 A | 12/2002 |

(Continued)

OTHER PUBLICATIONS

International Search Report issued in connection with PCT/JP2019/043011, dated Dec. 10, 2019. (2 pages).

*Primary Examiner* — Brian E Miller
(74) *Attorney, Agent, or Firm* — K&L Gates LLP

(57) ABSTRACT

A tape cartridge according to an embodiment of the present technology includes: a tape reel; a cartridge case; and a reel lock member. The tape reel includes a reel hub having a bottomed cylindrical shape, a tape having been wound on the reel hub. The cartridge case includes a first protruding portion and a plurality of second protruding portions, the first protruding portion protruding toward a center of a bottom portion of the reel hub, the plurality of second protruding portions being arranged around the first protruding portion. The reel lock member is disposed inside the reel hub. The reel lock member includes a first tubular portion and a plurality of second tubular portions, the first tubular portion fitting with the first protruding portion, the plurality of second tubular portions fitting with the plurality of second protruding portions. The reel lock member is movable in a (Continued)

direction of the one axis between a lock position and a lock release position, the reel lock member engaging with the bottom portion of the reel hub at the lock position, engagement between the reel lock member and the bottom portion of the reel hub being released at the lock release position.

11 Claims, 14 Drawing Sheets

(51) Int. Cl.
*G11B 23/037* (2006.01)
*G11B 23/027* (2006.01)
*H01Q 1/24* (2006.01)

(58) Field of Classification Search
CPC ..... G11B 5/00813; G11B 33/04; G11B 23/30; G11B 23/107; G11B 5/78; G11B 2220/90; G11B 23/037; G11B 23/027; G11B 23/0306; H01Q 1/24
See application file for complete search history.

(56) References Cited

U.S. PATENT DOCUMENTS

| | | | | | |
|---|---|---|---|---|---|
| 7,240,825 | B2* | 7/2007 | Tada | ...... | G11B 23/037 235/375 |
| 2002/0167760 | A1* | 11/2002 | Ridl | ...... | G11B 23/107 360/132 |
| 2002/0181152 | A1* | 12/2002 | Tsuyuki | ...... | G11B 23/044 360/132 |
| 2002/0195474 | A1* | 12/2002 | Tsuyuki | ...... | G11B 23/113 226/1 |
| 2003/0029951 | A1* | 2/2003 | Brummet | ...... | G11B 15/673 242/338.1 |
| 2004/0037004 | A1* | 2/2004 | Kitahara | ...... | G11B 15/07 360/133 |
| 2004/0149849 | A1* | 8/2004 | Argumedo | ...... | G11B 23/107 242/348 |
| 2004/0164198 | A1* | 8/2004 | Ishihara | ...... | G11B 23/043 242/348 |
| 2004/0164199 | A1* | 8/2004 | Ishihara | ...... | G11B 23/043 242/348 |
| 2004/0232266 | A1* | 11/2004 | Hiraguchi | ...... | G11B 23/037 242/338.1 |
| 2005/0023394 | A1* | 2/2005 | Fujii | ...... | G11B 23/043 242/338.1 |
| 2005/0023396 | A1* | 2/2005 | Asano | ...... | G11B 23/043 242/348 |
| 2005/0051655 | A1* | 3/2005 | Hiraguchi | ...... | G11B 23/107 242/338.1 |
| 2006/0214042 | A1* | 9/2006 | Suzuki | ...... | G11B 23/107 242/338.1 |
| 2007/0058290 | A1* | 3/2007 | Tada | ...... | G11B 23/107 360/92.1 |
| 2007/0246598 | A1* | 10/2007 | Onmori | ...... | G11B 23/044 242/610.4 |
| 2009/0050732 | A1* | 2/2009 | Ishikawa | ...... | G11B 23/107 242/608.8 |
| 2009/0078810 | A1* | 3/2009 | Fukuda | ...... | G11B 23/107 242/348 |
| 2009/0218430 | A1* | 9/2009 | Mori | ...... | G11B 23/037 242/348 |
| 2009/0218431 | A1* | 9/2009 | Mori | ...... | G11B 23/037 242/348 |
| 2010/0059617 | A1* | 3/2010 | Takenoshita | ...... | G11B 23/027 242/348.3 |
| 2015/0269965 | A1* | 9/2015 | Kumagai | ...... | G11B 23/107 242/348.2 |
| 2017/0316801 | A1* | 11/2017 | Sumiya | ...... | G11B 5/78 |
| 2020/0321033 | A1* | 10/2020 | Nakashio | ...... | G11B 23/0316 |
| 2021/0012804 | A1* | 1/2021 | Nakashio | ...... | G11B 33/04 |

FOREIGN PATENT DOCUMENTS

| | | |
|---|---|---|
| JP | 2003-109355 | 4/2003 |
| JP | 2003-109355 A | 4/2003 |
| JP | 2009-076160 | 4/2009 |
| JP | 2009-076160 A | 4/2009 |
| JP | 2011-113629 | 6/2011 |
| JP | 2011-113629 A | 6/2011 |

* cited by examiner

COMPARATIVE EXAMPLE

COMPARATIVE EXAMPLE

TAPE CARTRIDGE INCLUDING REEL LOCK MEMBER

TECHNICAL FIELD

The present technology relates to, for example, a tape cartridge that rotatably houses a reel on which a magnetic tape is wound.

BACKGROUND ART

As a magnetic tape cartridge used as an external recording medium for a computer or the like, there has been known in the past a magnetic tape cartridge that rotatably houses a single tape reel on which a magnetic tape has been wound in a cartridge case. This type of magnetic tape cartridge is used for storing data of a computer or the like, records important an enormous amount of information, and thus, needs to have a structure that does not become unusable due to impact such as dropping.

The above-mentioned single-reel-type magnetic tape cartridge is provided with a reel lock mechanism for suppressing rotation of a tape reel in order to prevent a magnetic tape from loosening due to rotation of the tape reel inside a cartridge case when the cartridge is not used. This reel lock mechanism has a different structure depending on the type of the magnetic tape cartridge. For example, an LTO type magnetic tape cartridge (linear tape open cartridge) has a reel lock mechanism inside a reel hub of a tape reel (see, for example, Patent Literature 1).

CITATION LIST

Patent Literature

Patent Literature 1: Japanese Patent Application Laid-open No. 2009-76160

DISCLOSURE OF INVENTION

Technical Problem

In the above-mentioned existing magnetic tape cartridge, when the tape reel is caused to rotate in a tape loosening direction or vibration or impact during transportation is applied, a reel lock mechanism is momentarily released, which causes unexpected tape loosening to occur in some cases.

In view of the circumstances as described above, it is an object of the present technology to provide a tape cartridge capable of preventing a tape from loosening due to vibration or impact.

Solution to Problem

A tape cartridge according to an embodiment of the present technology includes: a tape reel; a cartridge case; and a reel lock member.

The tape reel includes a reel hub having a bottomed cylindrical shape, a tape having been wound on the reel hub.

The cartridge case includes an upper shell and a lower shell. The upper shell includes a first protruding portion and a plurality of second protruding portions, the first protruding portion protruding toward a center of a bottom portion of the reel hub, the plurality of second protruding portions being arranged around the first protruding portion. The lower shell is coupled to the upper shell. The cartridge case rotatably houses the tape reel around one axis.

The reel lock member is disposed inside the reel hub. The reel lock member has a first surface and a second surface, the first surface including a first tubular portion and a plurality of second tubular portions, the first tubular portion fitting with the first protruding portion, the plurality of second tubular portions fitting with the plurality of second protruding portions, the second surface being capable of engaging with the bottom portion of the reel hub. The reel lock member is movable in a direction of the one axis between a lock position and a lock release position, the second surface engaging with the bottom portion of the reel hub at the lock position, engagement between the second surface and the bottom portion of the reel hub being released at the lock release position.

In the above-mentioned tape cartridge, the accuracy for positioning the reel lock member with respect to the upper shell is improved, and the tape reel is stably held at the lock position. As a result, it is possible to prevent the tape from loosening due to vibration during transportation or drop impact.

Each of the first protruding portion and the plurality of second protruding portions may have a cylindrical shape, and each of the first tubular portion and the plurality of second tubular portions may have a rectangular tube shape.

The plurality of second tubular portions may include four tubular portions arranged around the first tubular portion at equal angular intervals.

The first tubular portion may have four side surfaces, and each of the four side surfaces may form one corresponding side surface of the four tubular portions.

Each of the first protruding portion and the plurality of second protruding portions may have the same outer diameter.

The first protruding portion may include a plurality of ribs projecting toward the respective side surfaces of the first tubular portion.

The first tubular portion may include a plurality of protrusions facing the plurality of ribs.

Tips of the plurality of second protruding portions may each have a tapered shape with an angle of 15° or less between the corresponding tip and the direction of the one axis.

The tape cartridge may further includes a coil spring.

The coil spring is disposed between the upper shell and the reel lock member and urges the reel lock member to the lock position. The reel lock member further includes a plurality of projecting portions that is arranged around the plurality of second tubular portions and faces an inner diameter portion of the coil spring.

The reel lock member may further include an annular rib that is disposed around the plurality of projecting portions and faces an outer diameter portion of the coil spring.

The tape cartridge may further include a reel lock release member. The reel lock release member is disposed between the reel lock member and the bottom portion of the reel hub and is capable of causing the reel lock member to move to the lock release position against a biasing force of the coil spring.

Figure 7:
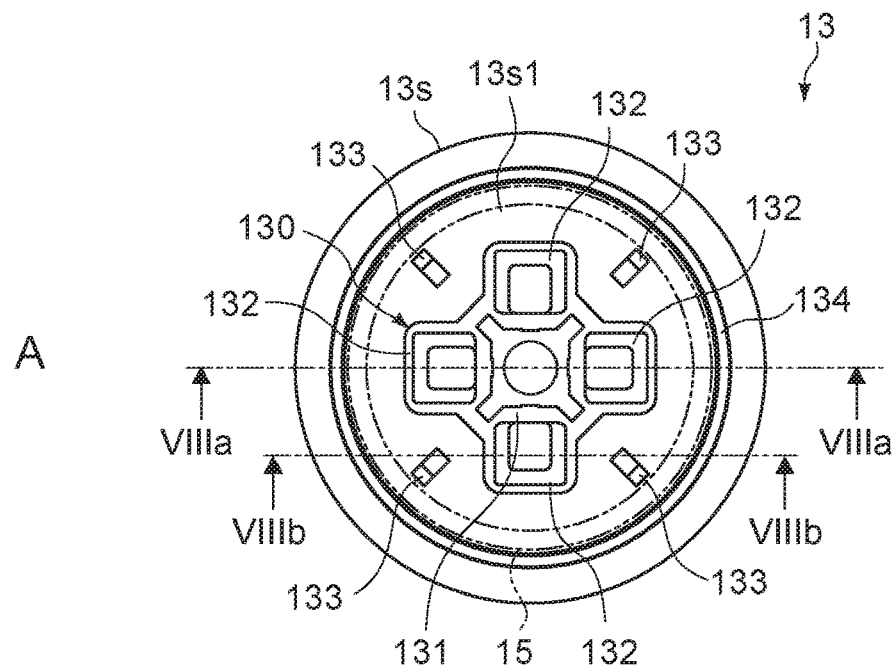
FIG. 7 is an overall view of a reel lock member, where Part A is a top view, Part B is a side view, and Part C is a bottom view.
Figure 7:
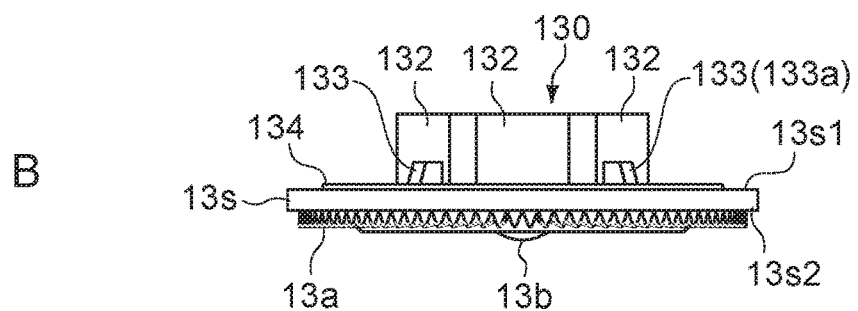
Figure 7:
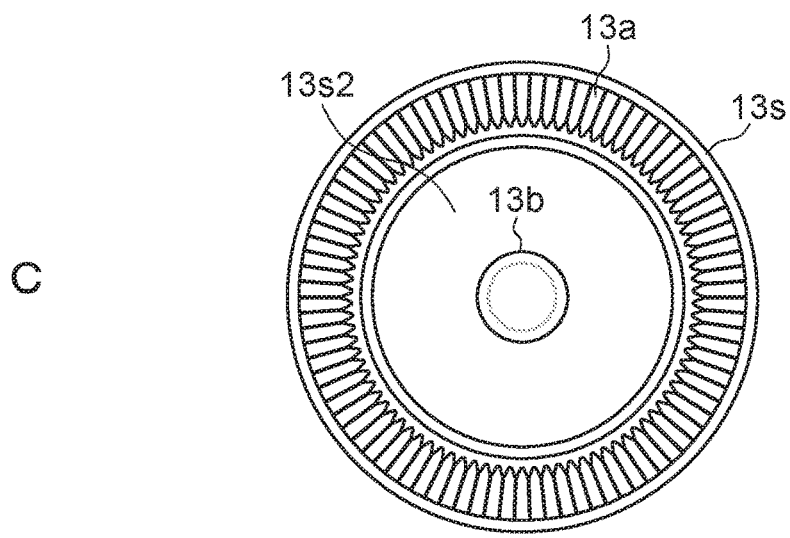

Part A is a cross-sectional view taken along the line [VIIIa]-[VIIIa] in FIG. 7 and Part B is a cross-sectional view taken along the line [VIIIb]-[VIIIb] in FIG. 7.

Figure 9:
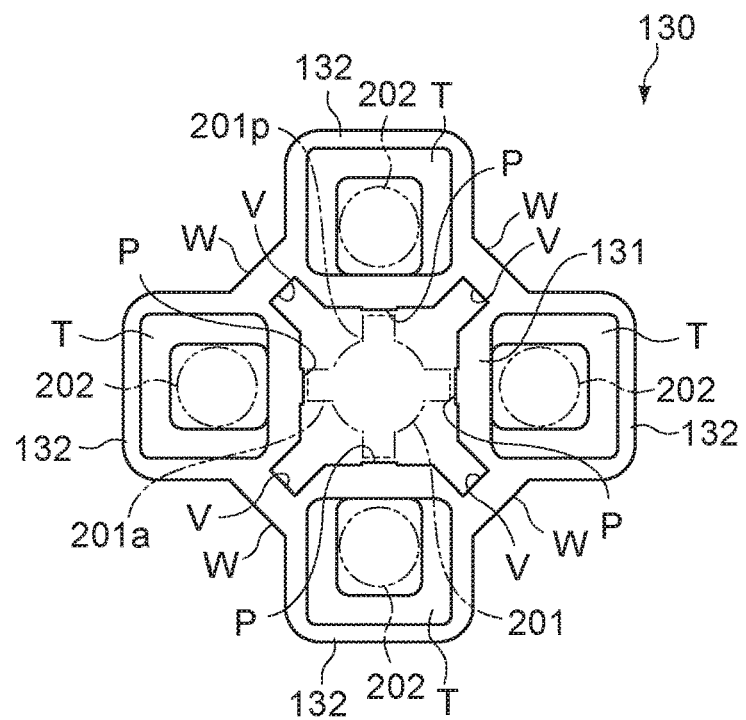

FIG. 9 is an enlarged plan view of a main part of the reel lock member.

Figure 10:
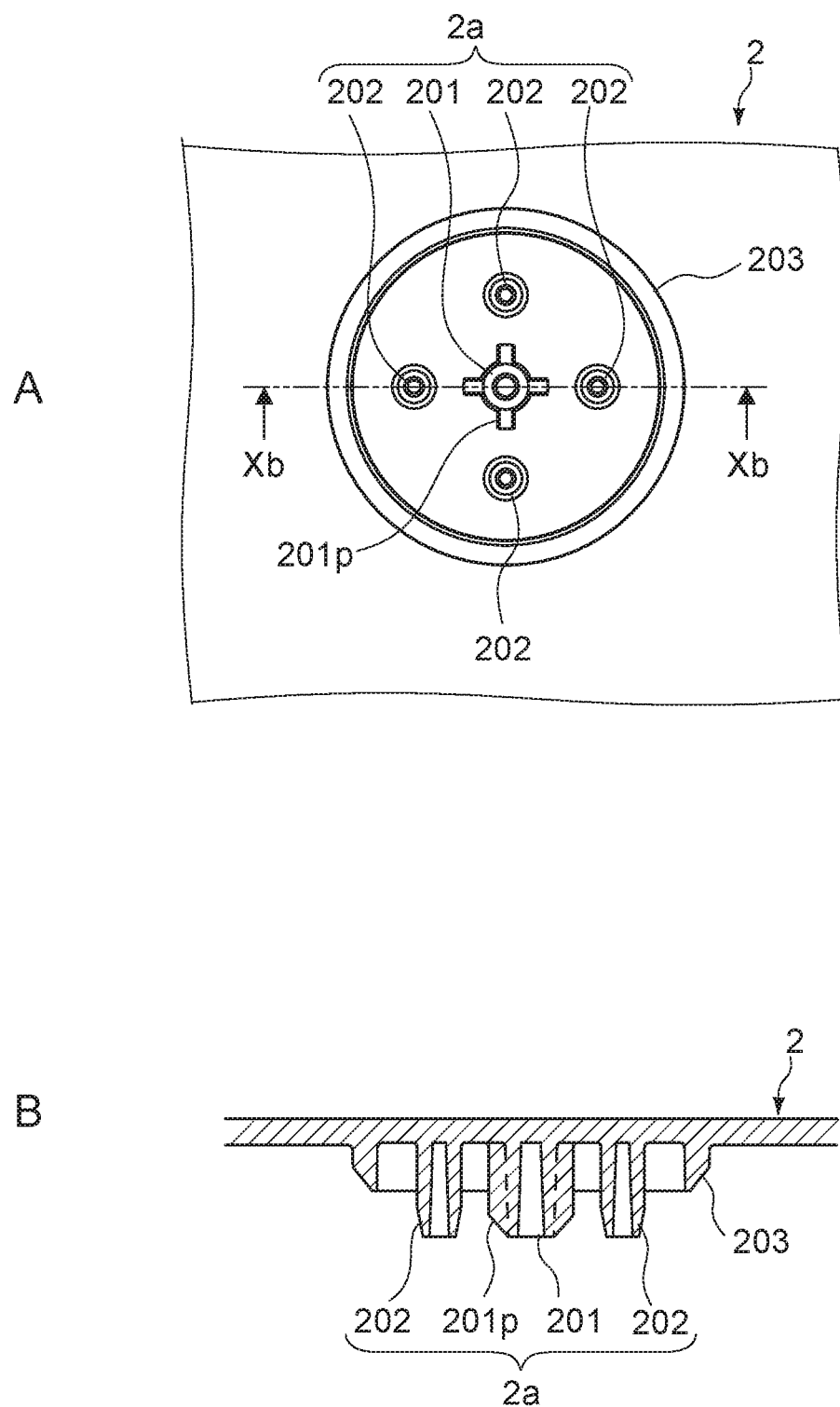

FIG. 10 is a diagram showing an inner surface structure of the upper shell fitting with the reel lock member, where Part A is a plan view of a main part as viewed from an inner surface side of an upper shell 2 and Part B is a cross-sectional view taken along the line [Xb]-[Xb] in Part A.

Figure 11:
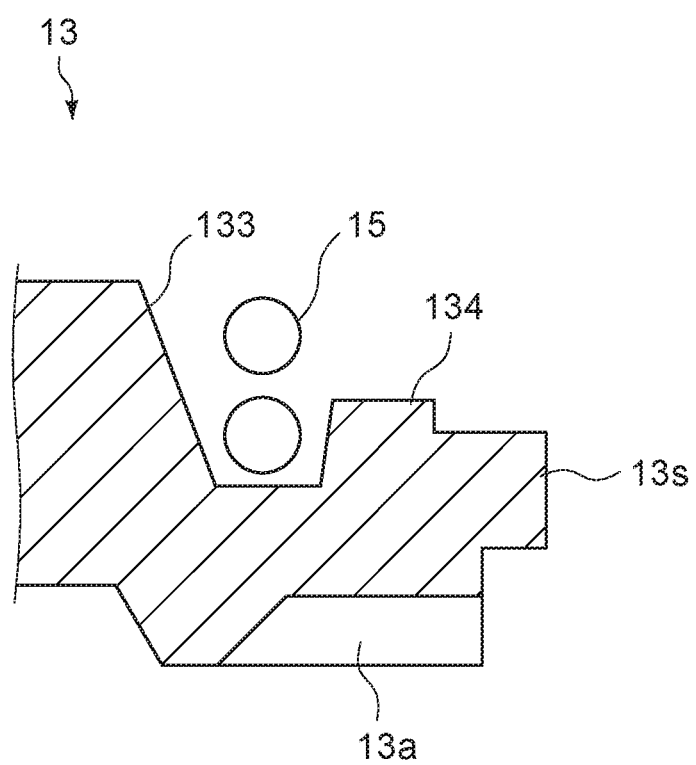

FIG. 11 is a side cross-sectional view of a main part of the reel lock member.

Figure 12:
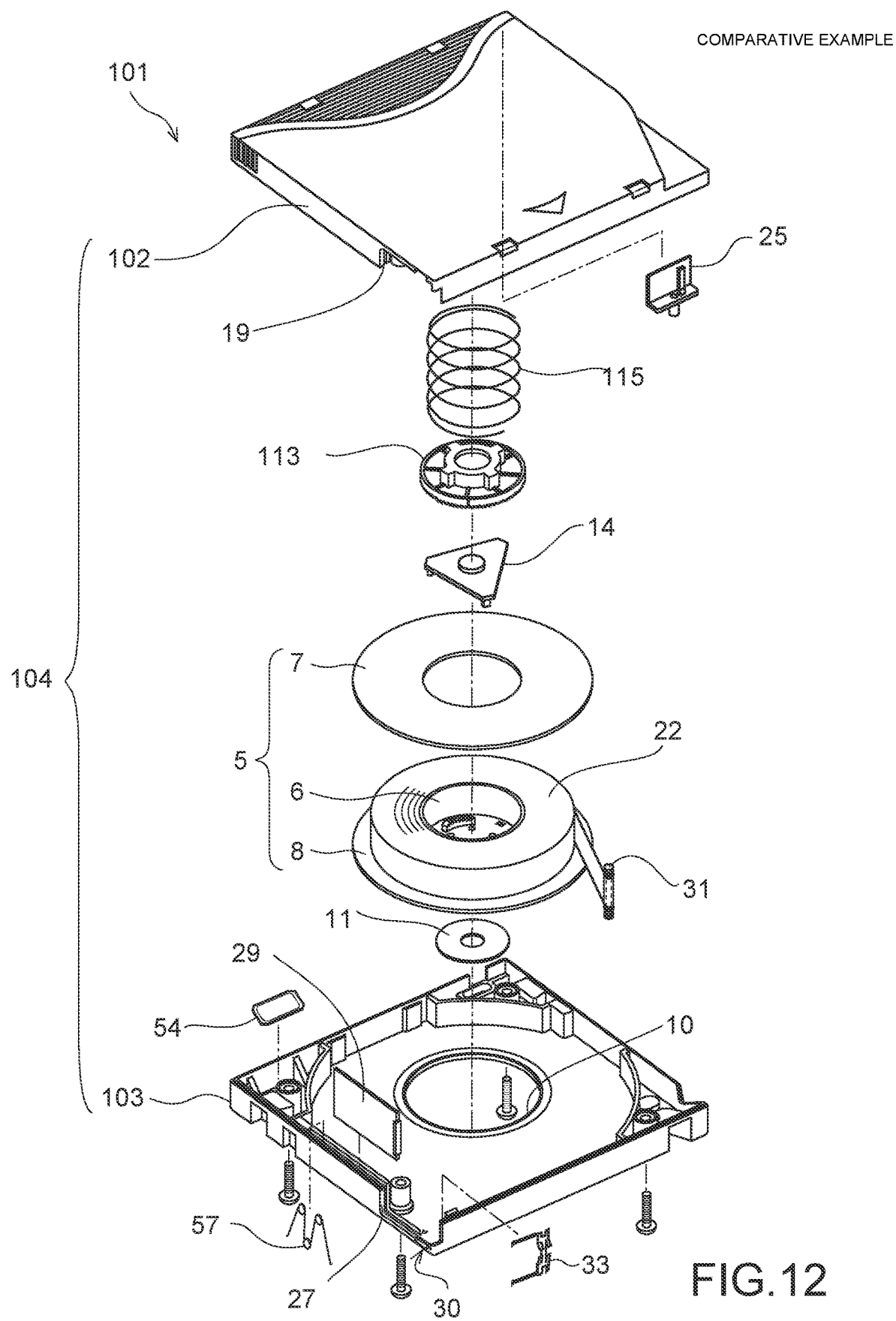

FIG. 12 is an exploded perspective view of a tape cartridge according to a Comparative Example.

Figure 13:
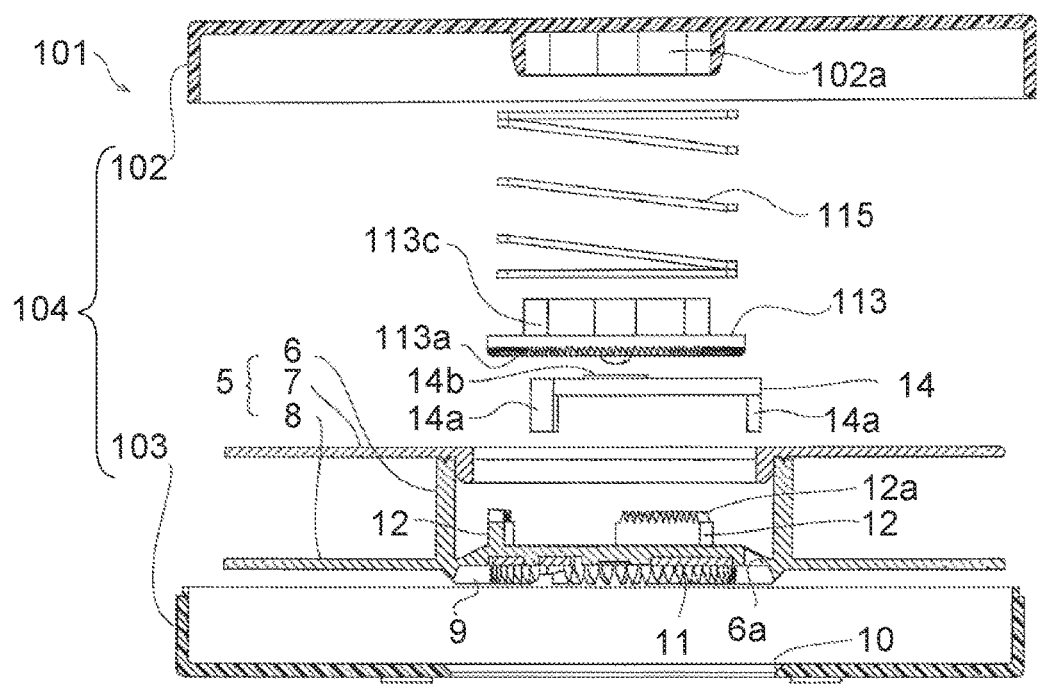

FIG. 13 is an exploded side perspective view of the tape cartridge according to the Comparative Example.

Figure 14:
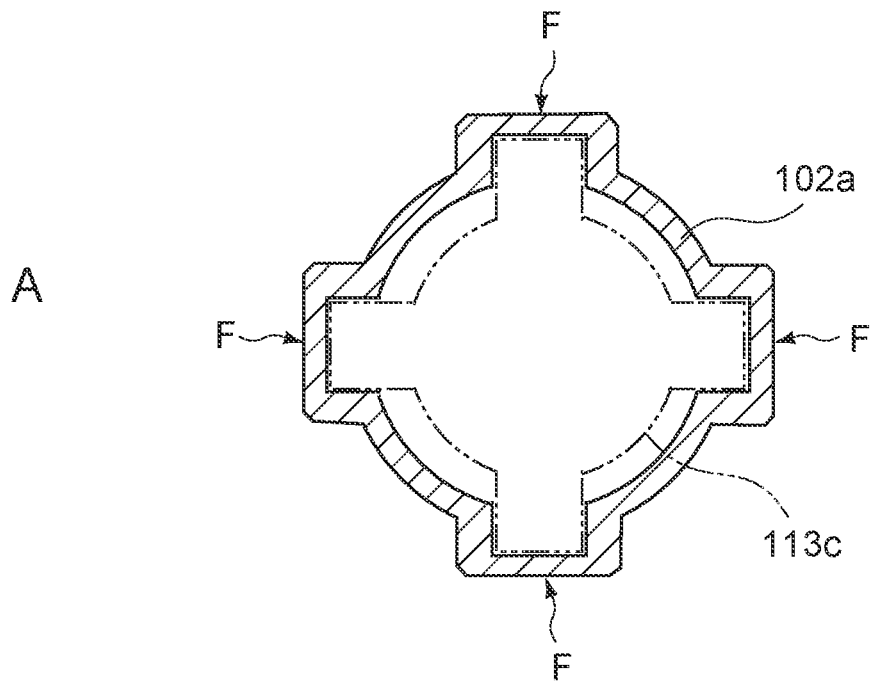
Figure 14:
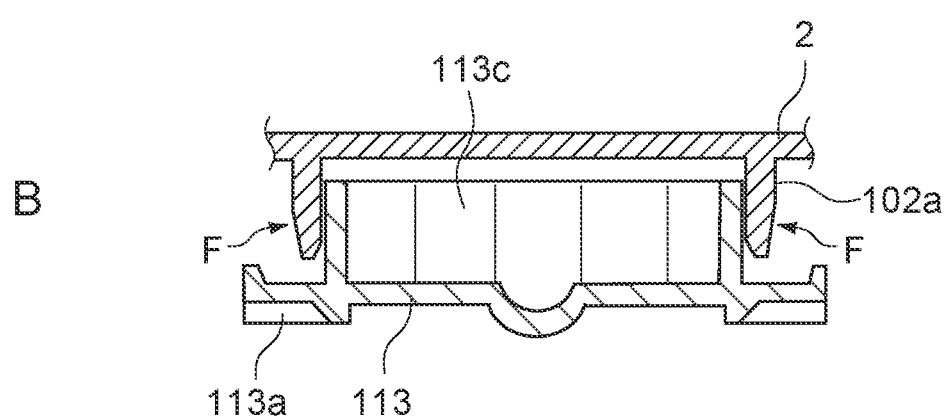
Figure 15:
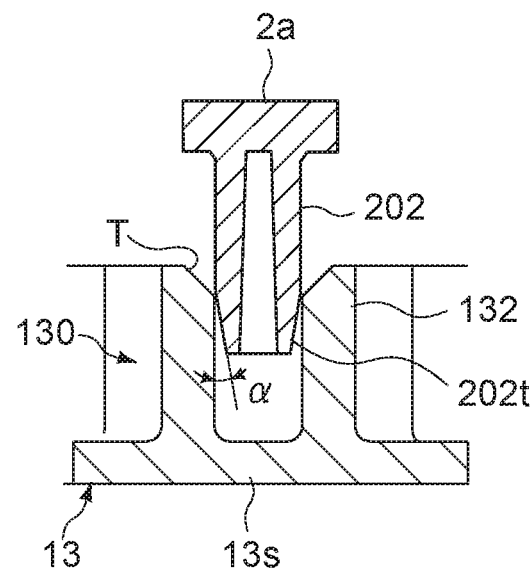

FIG. 14 is a cross-sectional view of a main part of a magnetic tape cartridge according to the Comparative Example, where Part A is a horizontal cross-sectional view and Part B is a side cross-sectional view thereof, FIG. 15 is a side cross-sectional view of a main part for describing the effect of a tape cartridge according to an embodiment of the present invention.

Figure 16:
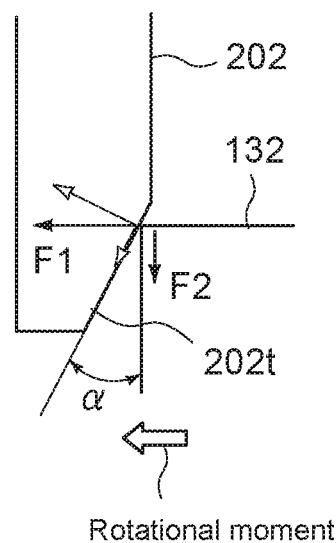

FIG. 16 is a side cross-sectional view of the main part.

MODE(S) FOR CARRYING OUT THE INVENTION

Hereinafter, an embodiment of the present technology will be described with reference to the drawings.

Figure 1:
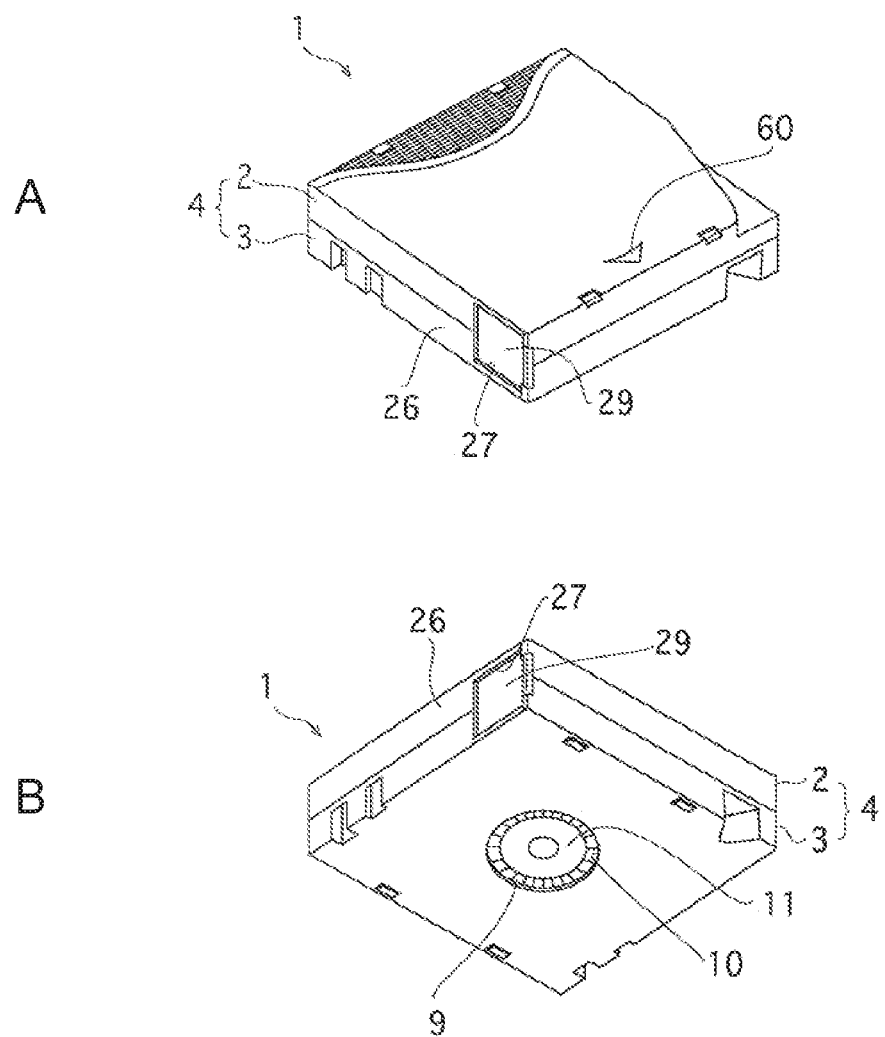
FIG. 1 is an overall perspective view of a tape cartridge according to an embodiment of the present technology, where Part A is a perspective view as viewed from an upper shell side and Part B is a perspective view as viewed from a lower shell side.
Figure 2:
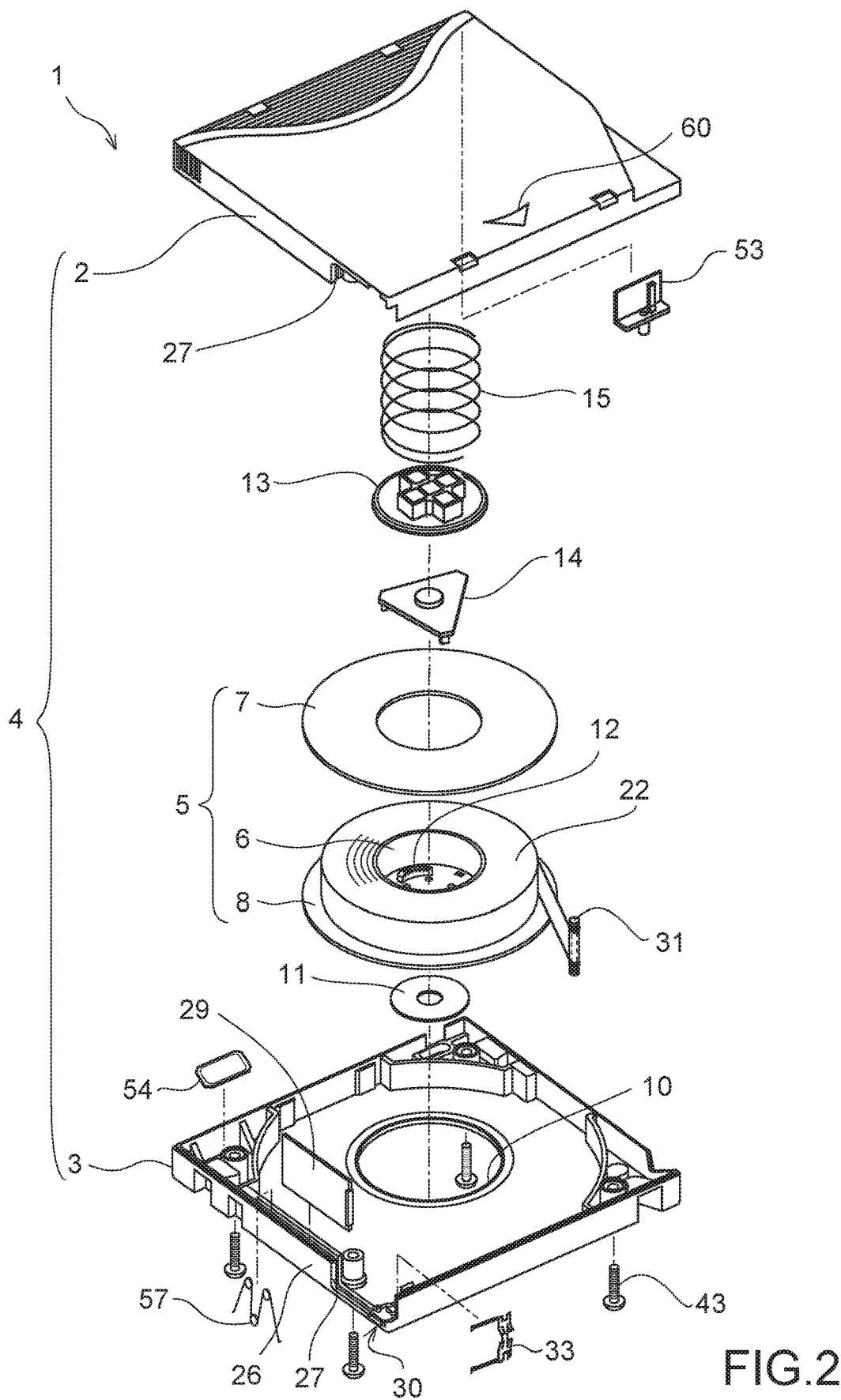
FIG. 2 is an exploded perspective view of the tape cartridge.
Figure 3:
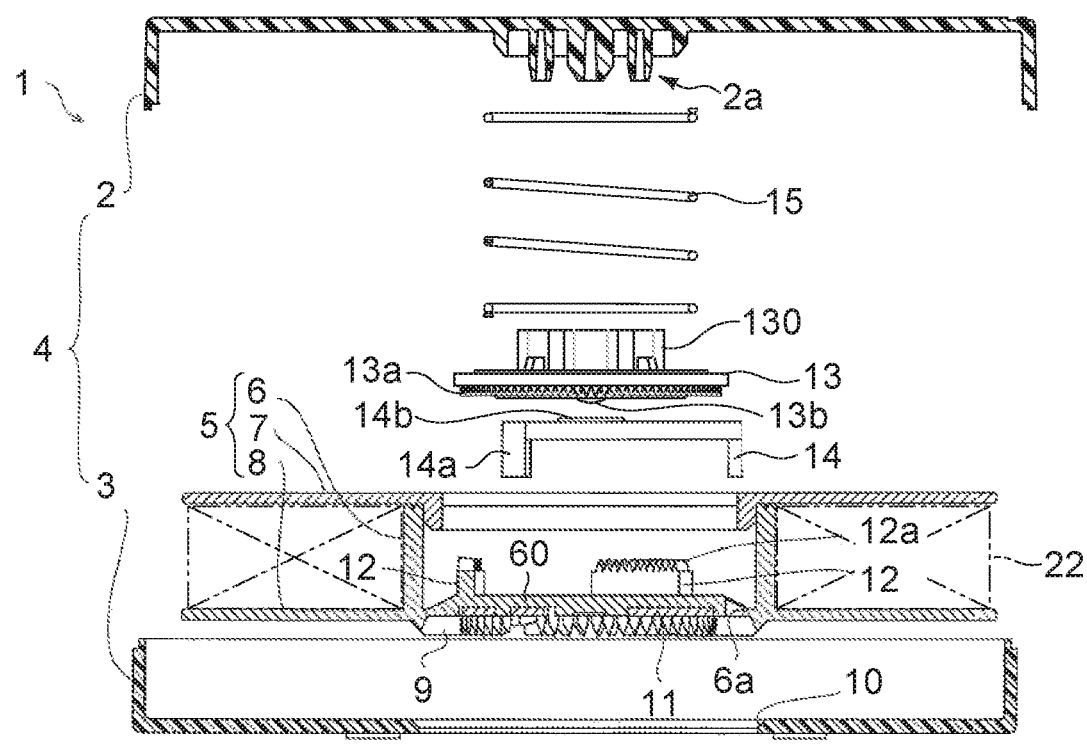
FIG. 3 is an exploded side cross-sectional view of the tape cartridge.
Figure 4:
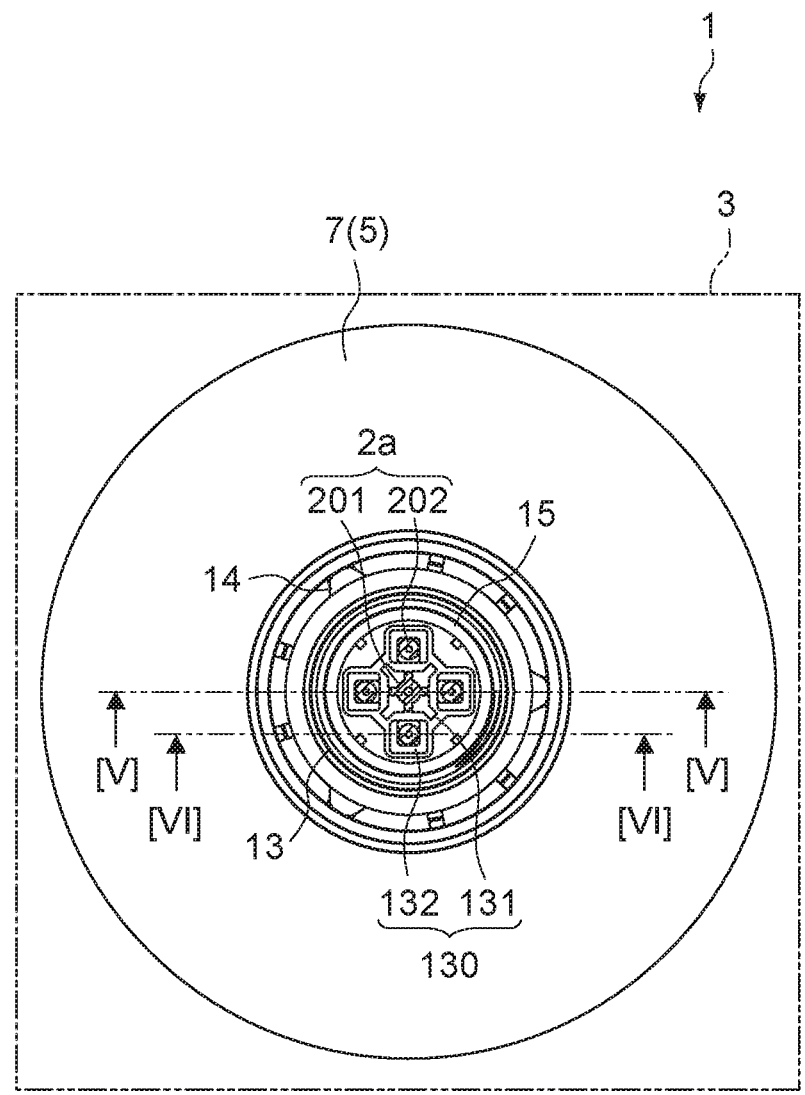
FIG. 4 is a horizontal cross-sectional view of the tape cartridge as viewed when the upper shell is removed.

FIG. 1 is an overall perspective view of a tape cartridge 1 according to an embodiment of the present technology, where Part A is a perspective view as viewed from an upper surface (upper shell 2) side and Part B is a perspective view as viewed from a lower surface (lower shell 3) side. FIG. 2 is an exploded perspective view of the tape cartridge 1, FIG. 3 is an exploded side cross-sectional view thereof, and FIG. 4 is a horizontal cross-sectional view of the tape cartridge 1 as viewed when the upper shell is removed. In FIG. 4, only the outer shape of the lower shell 3 is schematically shown.

[Overall Configuration]

The tape cartridge 1 according to this embodiment is configured as a magnetic tape cartridge conforming to the LTO standard. The tape cartridge 1 has a configuration in which a single tape reel 5 on which a magnetic tape 22 is wound is rotatably housed inside a cartridge case 4 formed by coupling the upper shell 2 and the lower shell 3 with a plurality of screw members 43.

The tape reel 5 includes a reel hub 6 having a bottomed cylindrical shape, an upper flange 7 joined to the upper end (open end) of the reel hub 6, and a lower flange 8 integrally formed at the lower end of the reel hub 6, and they are each formed of an injection molded body of a synthetic resin material.

A chucking gear 9 that engages with a reel rotation drive shaft of a tape drive device is annularly formed at the center of the lower surface of the tape reel 5, and exposed to the outside via an opening 10 provided at the center of the lower shell 3 as shown in Part B of FIG. 1. On the inner peripheral side of this chucking gear 9, an annular metal plate 11 that is magnetically attracted to the above-mentioned reel rotation drive shaft is fixed to the bottom outer surface of the reel hub 6 by insert molding.

A reel spring 15, a reel lock member 13, and a reel lock release member 14 are arranged between the inner surface of the upper shell 2 and the tape reel 5, which constitute a reel lock mechanism for suppressing rotation of the tape reel 5 when the tape cartridge 1 is not used. Note that details of this reel lock mechanism will be described below.

One side wall 26 of the cartridge case 4 is provided with an outlet 27 for pulling out one end of the magnetic tape 22 to the outside. A slide door 29 that opens and closes the outlet 27 is disposed inside the side wall 26. The slide door 29 is configured to slide in a direction of opening the outlet 27 against the biasing force of a torsion spring 57 by engaging with a tape loading mechanism (illustration omitted) of the tape drive device.

A leader pin 31 is fixed to one end of the magnetic tape 22. The leader pin 31 is configured to be attachable/detachable to/from a pin holding portion 33 provided on the inner side of the outlet 27. The pin holding portion 33 is attached to the inner surface of the upper shell 2 and the inner surface of the lower shell 3, and is configured to be capable of elastically holding the upper end portion and the lower end portion of the leader pin 31.

Then, in addition to a safety tab 53 for preventing erroneous erasure of information recorded on the magnetic tape 22, a cartridge memory 54 capable of reading/writing the content relating to the information recorded on the magnetic tape 22 in a non-contact manner is provided inside the cartridge case 4. The cartridge memory 54 is configured by a non-contact communication medium in which an antenna coil, an IC chip, and the like are mounted on a substrate.

[Reel Lock Mechanism]

Subsequently, details of the reel lock mechanism will be described.

As shown in FIG. 3, a reel lock mechanism for suppressing rotation of the tape reel 5 when the tape cartridge 1 is not used is provided inside the reel hub 6. The reel lock mechanism includes a plurality of gear forming walls 12 erected on the upper surface of a bottom portion 60 of the reel hub 6, the reel lock member 13 including an engaging teeth 13a that engage with a gear portion 12a formed on the upper surface of the gear forming wall 12, the reel lock release member 14 for releasing the engagement between the gear forming wall 12 and the reel lock member 13, and the reel spring 15 provided between the inner surface of the upper shell 2 and the upper surface of the reel lock member 13. The reel spring 15 is a coil spring, and urges the tape reel 5 toward the lower shell 3 side via the reel lock member 13.

The gear forming walls 12 each have an arc shape, and are formed at three places at equal intervals on the upper surface of the bottom portion 60 of the reel hub 6 and on the same circumference around the axis of the reel hub 6. The engaging teeth 13a of the reel lock member 13, which faces the gear portion 12a of the gear forming wall 12, are formed in an annular shape on the lower surface of the reel lock member 13, and receive the reel spring 15 to be constantly urged in a direction to engage with the gear portion 12a. A fitting portion 130 described below is formed on the upper surface of the reel lock member 13, and a protrusion group 2a that fits with the fitting portion 130 is formed in a substantially central portion of the inner surface of the upper shell 2.

The reel lock release member 14 has a substantially triangular shape, and is disposed between the bottom portion 60 of the reel hub 6 and the reel lock member 13. On the lower surface of the reel lock release member 14, a total of three legs 14a are formed so as to project downward from the vicinity of respective apexes of the substantially triangular shape. These legs are position between the gears of the chucking gear 9 via insertion holes 6a formed in the bottom portion 60 of the reel hub 6 when the cartridge is not used.

Each of the legs 14a of the reel lock release member 14 pressed upward by the reel rotation drive shaft of the tape drive device that engages with the chucking gear 9 when the cartridge is used, thereby causing the reel lock member 13 to move to the lock release position against the biasing force of the reel spring 15. Then, together with the tape reel 5, each of the legs 14a is configured to be capable of rotating with respect to the reel lock member 13. A support surface 14b that supports a sliding contact portion 13b having an arc-shaped cross section, which is formed to project in a substantially central portion of the lower surface of the reel lock member 13, is formed in a substantially central portion of the upper surface of the reel lock release member 14.

Figure 5:
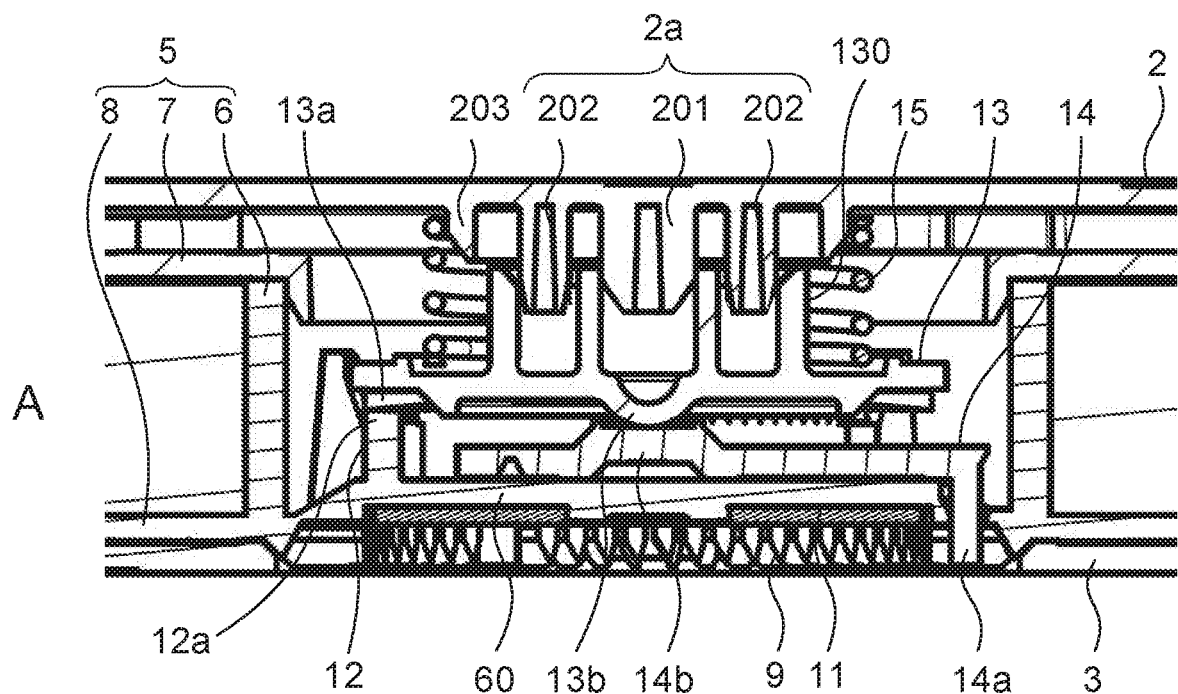
FIG. 5 is a cross-sectional view taken along the line [V]-[V] in FIG. 4, where Part A shows the state in which the tape cartridge is not used and Part B shows the state where the tape cartridge is used.
Figure 5:
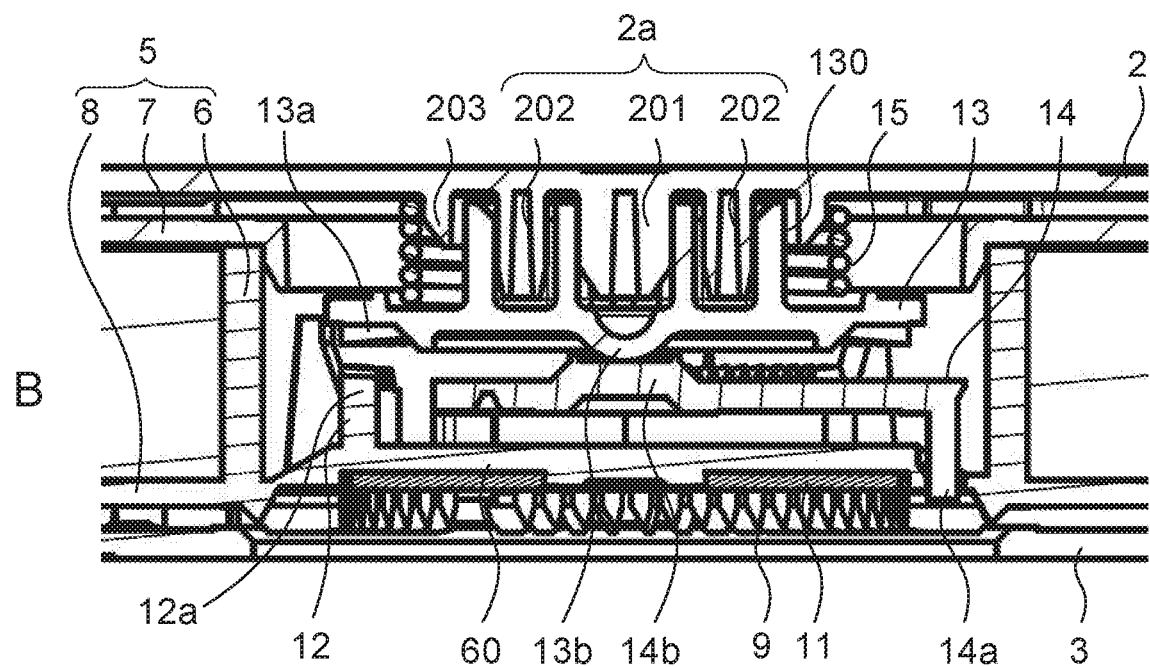
Figure 6:
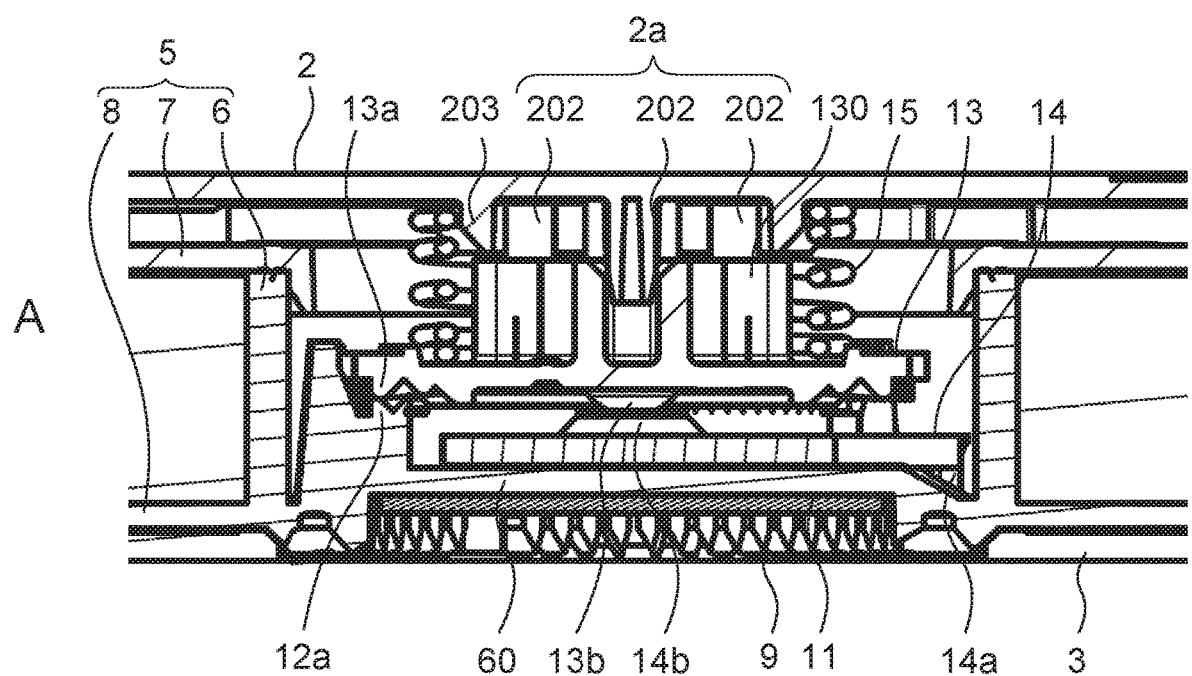
FIG. 6 is a cross-sectional view taken along the line [VI]-[VI] in FIG. 4, where Part A shows the state in which the tape cartridge is not used and Part B shows the state where the tape cartridge is used.
Figure 6:
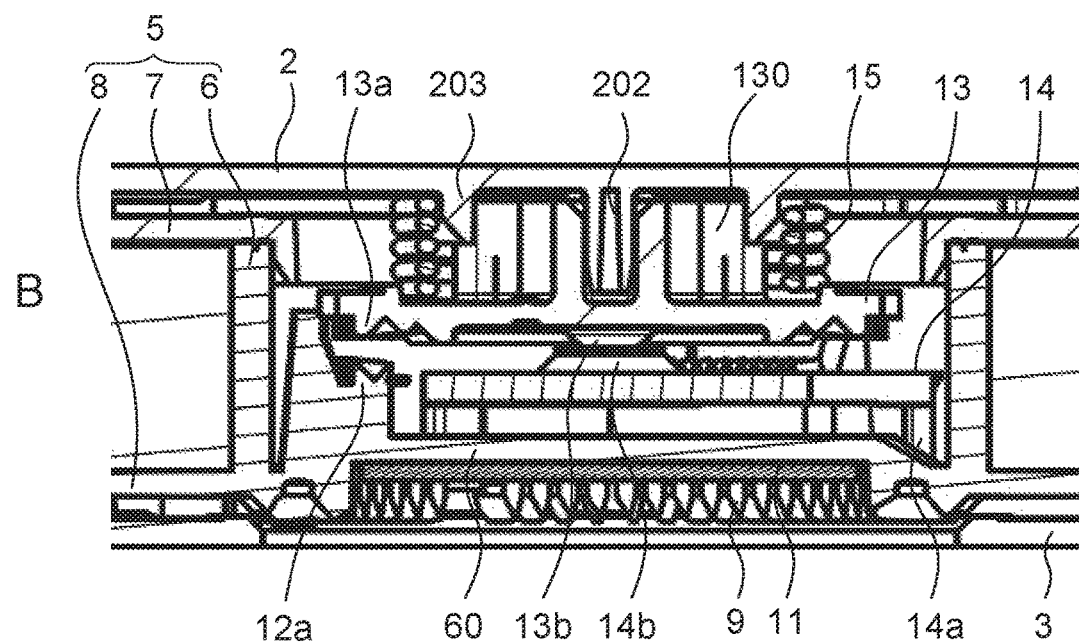

FIG. 5 is a cross-sectional view taken along the line [V]-[V] in FIG. 4, where Part A shows the state in which the tape cartridge 1 is not used and Part B shows the state where the tape cartridge 1 is used. FIG. 6 is a cross-sectional view taken along the line [VI]-[VI] in FIG. 4, where Part A shows the state in which the tape cartridge 1 is not used and Part B shows the state where the tape cartridge 1 is used.

In the tape cartridge 1 according to this embodiment, when not in use, the reel lock member 13 is a the lock position shown in Part A of FIG. 5 and Part A of FIG. 6, the tape reel 5 is pressed toward the lower shell 3 side by the biasing force of the reel spring 15, and the engaging teeth 13a is caused to engage with the gear portion 12a of the gear forming walls 12 to suppress rotation of the tape reel 5.

Meanwhile, when the tape cartridge 1 is used, the reel rotation drive shaft of the tape drive device (not shown) engages with the chucking gear 9, and thus, the legs 14a of the reel lock release member 14 facing between the gears of this chucking gear are pushed up toward the inside of the cartridge case 4. As a result, the reel lock member 13 moves to the lock release position shown in Part B of FIG. 5 and Part B of FIG. 6 against the biasing force of the reel spring 15, and thus, the engagement between the gear portion 12a and the engaging teeth 13a is released.

Then, the tape reel 5 unifies with the reel rotation drive shaft by the magnetic attraction effect between the metal plate 11 and the reel rotation drive shaft, and the tape reel 5 is rotationally driven via the chucking gear. At this time, the rotation operation of the reel lock member 13 is restricted by the fitting operation of the fitting portion 130 thereof and the protrusion group 2a of the upper shell, and the reel lock release member 14 rotates together with the tape reel 5 through a sliding contact operation of the support surface 14b of the upper surface and the sliding contact portion 13b of the reel lock member 13 in a point contact state.

[Reel Lock Member]

Subsequently, details of the reel lock member 13 will be described.

Figure 8:
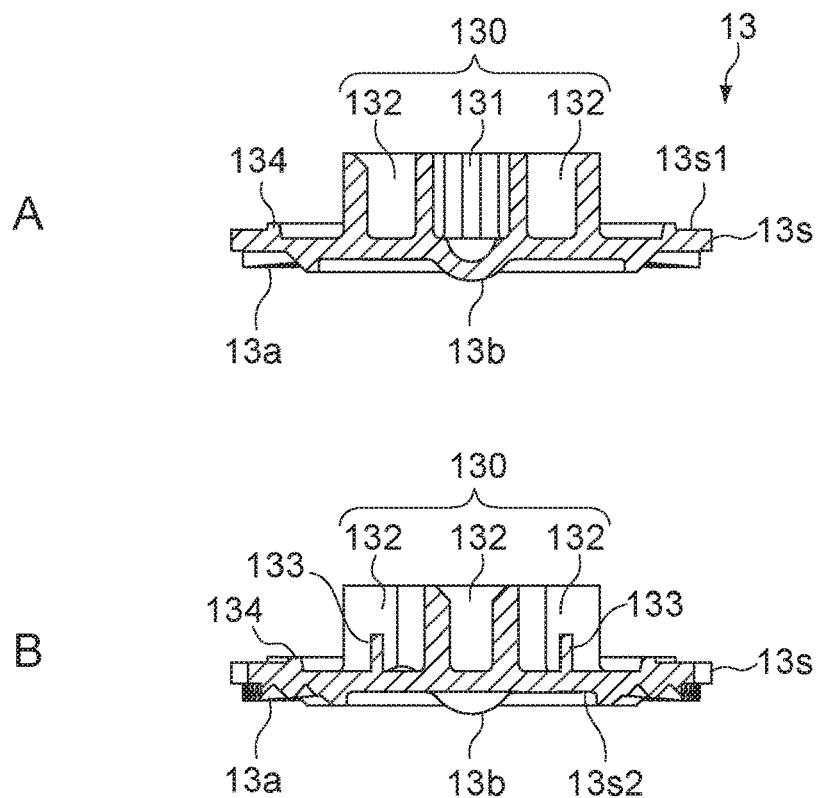
FIG. 8 is a side cross-sectional view of the reel lock member, where

FIG. 7 is an overall view of the reel lock member 13, where Part A is a top view, Part B is a side view, and Part C is a bottom view. FIG. 8 is a side cross-sectional view of the reel lock member 13, where Part A is a cross-sectional view taken along the line [VIIIa]-[VIIIa] in FIG. 7 and Part B is a cross-sectional view taken along the line [VIIIb]-[VIIIb] in FIG. 7. FIG. 9 is an enlarged plan view of the fitting portion 130 of the reel lock member 13.

The reel lock member 13 is an injection molded body formed of a synthetic resin material and has a disc shape as a whole. The synthetic resin material is not particularly limited, and the reel lock member 13 is formed of, for example, a resin material having excellent slidability such as POM (polyacetal). The reel lock member 13 includes a disc-shaped component body 13s. The component body 13s has a front surface 13s1 (first surface) and a back surface 13s2 (second surface). The fitting portion 130 is provided on the front surface 13s1, and the annular engaging teeth 13a and the sliding contact portion 13b located at the center thereof are provided on the back surface 13s2.

The protrusion group 2a that fits with the fitting portion 130 is provided in the central portion of the inner surface of the upper shell 2. FIG. 10 is a diagram showing an example of the configuration of the protrusion group 2a, where Part A is a plan view of the protrusion group 2a as viewed from an inner surface side of an upper shell 2 and Part B is a cross-sectional view taken along the line [Xb]-[Xb] in Part A. As shown in Part A and Part B of FIG. 10, the protrusion group 2a includes a first protruding portion 201 and a plurality of second protruding portions 202. An annular rib 203 provided around the protrusion group 2a is for positioning the upper end of the reel spring 15. The protrusion group 2a and the rib 203 are integrally formed with the upper shell 2, and are formed of, for example, a synthetic resin material such as polycarbonate.

The first protruding portion 201 projects from the inner surface of the upper shell 2 toward the center of the bottom portion 60 of the reel hub 6. The plurality of second protruding portions 202 is arranged around the first protruding portion 201. In this embodiment, the plurality of second protruding portions 202 includes four tubular portions arranged on the circumference concentric with the axis of the first protruding portion 201 at intervals of 90°. The first protruding portion 201 and the second protruding portion 202 each independently project from the inner surface of the upper shell 2 at the same height, and are each formed in a cylindrical shape having the same outer diameter. The tip portion of each of the first protruding portion 201 and the second protruding portion 202 is formed in a tapered shape, and thus, it is possible to improve the assemblability with the fitting portion 130.

The fitting portion 130 is provided in a central portion of the front surface 13s1 of the component body 13s. The fitting portion 130 includes a first tubular portion 131 and a plurality of second tubular portions 132 arranged therearound.

The first tubular portion 131 has an axis passing through the center of the bottom portion of the reel hub 6, and fits with the first protruding portion 201. The plurality of second tubular portions 132 is arranged around the first tubular portion 131 and respectively fit with the plurality of second protruding portions 202. The plurality of second tubular portions 132 include four tubular portions arranged on the circumference concentric with the axis of the first tubular portion 131 at intervals of 90°.

The first tubular portion 131 positions the reel lock member 13 in a horizontal direction with respect to the upper shell 2 by the fitting operation with the first protruding portion 201. The second tubular portion 132 positions the reel lock member 13 around the axis with respect to the upper shell 2 by the fitting operation with the second protruding portion 202. Since the first and second tubular portions 131 and 132 are configured to respectively fit the first and second protruding portions 201 and 202 independently as described above, it is possible to suppress rattling of the reel lock member 13 with respect to the upper shell 2 and more stably keep the rotation restricted state (locked state) of the tape reel 5 as compared with the case where single recessed and projecting structure portions are caused to fit with each other (see Part A and Part B of FIG. 14) as described below.

Subsequently, details of the fitting portion 130 of the reel lock member 13 will be described.

As described above, the fitting portion 130 includes the first tubular portion 131 and the four second tubular portions 132. In this embodiment, as shown in FIG. 9, the four second tubular portions 132 are connected to each other via a plurality of connecting portions W. Each of the connection portions W forms a part of the side surface of the fitting portion 130.

The first tubular portion 131 is provide between the four second tubular portions 132. In this embodiment, each of the first tubular portion 131 and the second tubular portion 132 is formed in a rectangular tube shape having four side surfaces, and the four side surfaces of the first tubular portion 131 each form one side surface on the inner side of the respective four second tubular portions 132. As a result, since the configuration of the fitting portion 130 can be simplified, it is possible to achieve the moldability and reduction in resin material to be used. Further, since the distance between the first tubular portion 131 and the second tubular portion 132 and the distance between the four second tubular portions 132 can be minimized, it is possible to minimize the fitting portion 130.

Further, groove portions V are provided at the four corners of the inner surface of the first tubular portion 131. As a result, it is possible to suppress molding defects (sinks) due to the presence of a region where the resin thickness is locally large, and improves the dimension accuracy of the first and second tubular portions 131 and 132.

Further, since the first and second tubular portions 131 and 132 that fit with the first and second protruding portions 201 and 202, which are each formed in a rectangular tube shape, are each formed in a rectangular tube shape, the assemblability is improved. Further, as shown in FIG. 9, the contact point between the first tubular portion 131 and the first protruding portion 201 after fitting and the contact point between the second tubular portion 132 and the second protruding portion 202 are stably determined. As a result, it is possible to reduce rattling of the reel lock member 13 with respect to the upper shell 2.

In order to improve the accuracy for positioning the reel lock member 13 in a horizontal direction with respect to the upper shell 2, it is favorable that the gap between the first tubular portion 131 and the first protruding portion 201 is smaller. In this regard, in this embodiment, as shown in FIG. 9, the first protruding portion 201 includes a plurality of ribs 201p that projects toward the inner wall surface of the first tubular portion 131. The plurality of ribs 201p is provided on the peripheral surface of the first protruding portion 201 at intervals of 90°. The plurality of ribs 201p projects toward the respective inner wall surfaces of the first tubular portion 131, and thus, the gap with the first tubular portion 131 is reduced. In accordance with this configuration, it is possible to easily improve the dimension accuracy as compared with the case where the first protruding portion 201 is molded so that the outer diameter thereof matches the internal dimension of the first tubular portion 131.

Note that a plurality of protrusions P that faces respective ribs 201p of the first protruding portion 201 may be provided similarly also on the inner wall surface of the first tubular portion 131 (see FIG. 9). As a result, it is possible to further reduce the clearance between the first tubular portion 131 and the first protruding portion 201. The height of each of the protrusions P is not particularly limited, and can be appropriately set in accordance with the height of the rib 201p of the first protruding portion 201.

A tapered surface T that guides the second protruding portion 202 to the inside of the second tubular portion 132 is provided at the opening of the second tubular portion 132. As a result, the second protruding portion 202 can be easily fitted with the second tubular portion 132, and it is possible to improve the assemblability of the reel lock member 13 with respect to the upper shell 2.

The reel lock member 13 further includes a plurality of projecting portions 133 that supports the reel spring 15, and an annular rib 134.

The plurality of projecting portions 133 is arranged around the fitting portion 130, and is integrally provided on the front surface 13s1 of the component body 13s. As shown in Part A of FIG. 7, each of the projecting portions 133 faces the inner diameter portion of the reel spring 15. The plurality of projecting portions 133 is arranged around the fitting portion 130 at equal angular intervals. In this embodiment, the plurality of projecting portions 133 includes four projecting portions arranged on the circumference concentric with the axis of the first tubular portion 131 at intervals of 90°. The number of the projecting portions is not limited thereto, and only needs to be two or more, or favorably three or more.

The annular rib 134 is disposed around the plurality of projecting portions 133, and is integrally provided on the front surface 13s1 of the component body 13s. The annular rib 134 has a circular shape concentric with the fitting portion 130. As shown in Part A of FIG. 7, the annular rib 134 faces the outer diameter portion of the reel spring 15. The annular rib 134 is formed so that the maximum height thereof is the diameter of the metal wire forming the reel spring 15 or around the diameter.

FIG. 11 is a side cross-sectional view of a main part of the reel lock member 13, which indicates the relationship between the projecting portion 133, the annular rib 134, and the reel spring 15. As shown in the figure, the distance between the projecting portion 133 and the annular rib 134 is set to be equal to or larger than the diameter of the metal wire forming the reel spring 15 and less than twice the diameter. As a result, since two or more metal wires do not enter between the projecting portion 133 and the annular rib 134, the spring end portions are prevented from shifting and overlapping even in the case where a force in the lateral direction is applied due to vibration during transportation or drop impact.

The projecting portion 133 has a height dimension larger than that of the annular rib 134. As a result, the reel spring 15 is stably positioned with respect to the reel lock member 13. The side surface on the outer peripheral side of each of the projecting portions 133 is a tapered surface that is inclined downward. This tapered surface functions as a guide surface that guides the reel spring 15 to the outer peripheral side of the projecting portion 133.

The reel lock member 13 is configured to be movable in the direction of the axis of the tape reel 5 between a lock position and a lock release position, the engaging teeth 13a engaging with the gear forming walls 12 (gear portion 12a) of the bottom portion 60 of the reel hub 6 at the lock position, engagement between the engaging teeth 13a and the gear portion 12a being released at the lock release position.

Here, in this type of tape cartridge, when the tape reel is caused to rotate in a tape loosening direction or vibration or impact during transportation is applied, the reel lock mechanism is momentarily released, which causes unexpected tape loosening to occur in some cases.

For example, in the case where the cartridge is subjected to drop impact, the tape reel receives an inertial force in the axial direction or around the axis thereof and unstably swings inside the tape cartridge. Then, if a force of such a magnitude that the gear portion of the reel lock member gets over the gear portion of the reel hub acts on the tape reel even momentarily, the tape reel cannot be prevented from moving in the rotation direction. In recent years, with the progress of thinner magnetic tapes, the tape length is becoming longer and longer and also the weight of the tape reel on which the magnetic tape is wound tends to increase. As a result, the inertial mass of the tape reel increases, and thus, the above-mentioned problem becomes more remarkable.

In accordance with this embodiment, since the first and second tubular portions 131 and 132 are configured to respectively fit with the first and second protruding portions 201 and 202 independently as described above, it is possible to suppress rattling of the reel lock member 13 with respect to the upper shell 2 and more stably keep the rotation restricted state (locked state) of the tape reel 5 as compared with the case where single recessed and projecting structure portions are caused to fit with each other.

For example, a configuration of a tape cartridge 101 including a reel lock member 113 according to a Comparative Example is shown in FIG. 12 and FIG. 13. FIG. 12 is an exploded perspective view of the tape cartridge 101. FIG. 13 is an exploded side perspective view of the tape cartridge 101. Note that in each drawing, the components corresponding to those in FIG. 2 and FIG. 3 are denoted by the same reference symbols and details thereof will be omitted.

In the tape cartridge 101 according to the Comparative Example, a fitting portion 113c of the reel lock member 113 has a single projecting structure surface. Meanwhile, a fitting wall portion 102a that fits with the fitting portion 113c of the reel lock member 113 is provide in the central portion of the inner surface of the upper shell 2. As shown in FIG. 13, the fitting wall portion 102a is formed in annular shape so as to be capable of covering the outer peripheral surface of the fitting portion 113c.

FIG. 14 is a cross-sectional view of a main part of the magnetic tape cartridge according to the Comparative Example, where Part A is a horizontal cross-sectional view showing the planar shape of the fitting wall portion 102a and Part B is a side cross-sectional view showing the relationship between the fitting wall portion 102a and the fitting portion 113c.

As shown in Part A of FIG. 14, the fitting wall portion 102a has a peripheral surface including recessed and projecting portions having a shape corresponding to the outer shape of the fitting portion 113c, and four recessed and projecting fitting structures F provided at intervals of 90° between the fitting wall portion 102a and the fitting portion 113c. In the Comparative Example, the reel lock member 113 and an upper shell 102 are relatively positioned by the fitting operation of single structure portions of the fitting portion 113c and the fitting wall portion 102a.

However, the fitting operation of the single structure portions cannot ensure high dimensional accuracy due to a molding problem and the reel lock member 113 is inclined at an arbitrary angle with respect to the upper shell 102 in the fitted state in some cases. In this case, the reel lock member 113 tilts in a cartridge case 104 when being subjected to vibration during transportation or drop impact, and a gear portion 113a of the reel lock member 113 easily gets over the gear portion 12a of the reel hub 6 when a force is applied in the rotation direction of the tape reel 5. As a result, the tape reel 5 cannot be prevented from rotating, which induces loosening of the magnetic tape 22.

On the other hand, in the tape cartridge 1 according to this embodiment, the fitting portion 130 (first and second tubular portions 131 and 132) of the reel lock member 13 and the protrusion group 2a (first and second protruding portions 201 and 202) of the upper shell 2 are relatively positioned by the fitting operations of a plurality of structure portions. For this reason, the accuracy for positioning the reel lock member 13 with respect to the upper shell 2 is improved, and it is possible to stably hold the tape reel 5 at the lock position while preventing the reel lock member 13 from tilting with respect to the upper shell 2. Further, even if the tape reel 5 receives an inertial force in the rotation direction due to vibration during transportation or drop impact, the stable rotation restriction is ensured b the plurality of fitting structures between the second tubular portion 132 and the second protruding portion 202, and thus, the tape is prevented from loosening due to vibration or impact.

In the case where the reel lock member 13 is at the lock position, the rotation restricting force of the tape reel 5 in the witting structure between the second tubular portion 132 and the second protruding portion 202 can be adjusted also by the shape of the contact portion between the second tubular portion 132 and the second protruding portion 202. For example, the fitting relationship between the second tubular portion 132 and the second protruding portion 202 in the case where the reel lock member 13 is at the lock position is schematically shown in FIG. 15.

As shown in FIG. 15, in the case where the second protruding portion 202 is at the lock position, a tapered tip portion 202t is in contact with or close to the lower end of the tapered surface T of the second tubular portion 132. In the case where a rotational moment acts on the reel lock member 13 in this state, a stress F1 parallel to the rotation direction acts on the tip portion 202t of the second protruding portion 202 as shown in FIG. 16, and a reaction force F2 perpendicular to the stress F1 acts on the second tubular portion 132. The reaction force F2 corresponds to the stress that urges the second tubular portion 132 downward, i.e., toward the lock position. The reaction force F2 can be adjusted by an inclination angle α of the tip portion 202t of the second protruding portion 202 with respect to the vertical direction (rotational axis direction of the tape reel).

The angle α is favorable 15° or less, and is, for example, 10°. As a result, even if the reel lock member 13 receives a rotational moment, the rotational moment can be converted into a pressing force toward the lock position, and thus, it is possible to effectively prevent the tape reel 5 from unnecessarily rotating.

Modified Example

For example, although the first and second tubular portions 131 and 132 of the reel lock member 13 are each formed in a substantially rectangular tube shape having a quadrangular cross section in the above-mentioned embodiment, the present technology is not limited thereto and the first and second tubular portions 131 and 132 may each be formed in another tubular shape such as a cylindrical shape.

Similarly, although the first and second protruding portions 201 and 202 of the upper shell 2 are each formed in a cylindrical shape, the present technology is not limited thereto and the first and second protruding portions 201 and 202 may each be formed in another axial shape such as a columnar shape and a prismatic shape.

Each of the four side surfaces of the first tubular portion does not necessarily need to be configured by a side surface of a part of the second tubular portion, and may have a side surface independent of the second tubular portion.

The number of the second tubular portions 132 and the number of the second protruding portions 202 are not limited to four, and only need to be two or more.

Although the magnetic tape cartridge incorporating the tape reel on which the magnetic tape is wound has been described in the above-mentioned embodiment, the present technology can be similarly applied to a cleaning tape cartridge, incorporating a tape real on which a cleaning tape is wound.

Although the tape cartridge conforming to the LTO standard has been described in the above-mentioned embodiment, the present technology is not limited thereto and can be similarly applied to a reel lock mechanism in a tape cartridge conforming to another standard.

It should be noted that the present technology may take the following configurations.

(1) A tape cartridge, including:
a tape reel that includes a reel hub having a bottomed cylindrical shape, a tape having been wound on the reel hub;
a cartridge case that includes an upper shell and a lower shell and rotatably houses the tape reel around one axis, the upper shell including a first protruding portion and a plurality of second protruding portions, the first protruding portion protruding toward a center of a bottom portion of the reel hub, the plurality of second protruding portions being arranged around the first protruding portion, the lower shell being coupled to the upper shell; and
a reel lock member disposed inside the reel hub, the reel lock member having a first surface and a second surface, the first surface including a first tubular portion and a plurality of second tubular portions, the first tubular portion fitting with the first protruding portion, the plurality of second tubular portions fitting with the plurality of second protruding portions, the second surface being capable of engaging with the bottom portion of the reel hub, the reel lock member being movable in a direction of the one axis between a lock position and a lock release position, the second surface engaging with the bottom portion of the reel hub at the lock position, engagement between the second surface and the bottom portion of the reel hub being released at the lock release position.

(2) The tape cartridge according to (1) above, in which
each of the first protruding portion and the plurality of second protruding portions has a cylindrical shape, and each of the first tubular portion and the plurality of second tubular portions has a rectangular tube shape.

(3) The tape cartridge according to (2) above, in which the plurality of second tubular portions includes four tubular portions arranged around the first tubular portion at equal angular intervals.

(4) The tape cartridge according to (3) above, in which the first tubular portion has four side surfaces, and each of the four side surfaces forms one corresponding side surface of the four tubular portions.

(5) The tape cartridge according to any one of (2) to (4) above, in which
each of the first protruding portion and the plurality of second protruding portions has the same outer diameter.

(6) The tape cartridge according to any one of (2) to (5) above, in which
the first protruding portion includes a plurality of ribs projecting toward the respective side surfaces of the first tubular portion.

(7) The tape cartridge according to (6) above, in which the first tubular portion includes a plurality of protrusions facing the plurality of ribs.

(8) The tape cartridge according to any one of (1) to (7) above, in which
tips of the plurality of second protruding portions each have a tapered shape with an angle of 15° or less between the corresponding tip and the direction of the one axis.

(9) The tape cartridge according to any one of (1) to (8), further including
a coil spring that is disposed between the upper shell and the reel lock member and urges the reel lock member to the lock position, wherein
the reel lock member further includes a plurality of projecting portions that is arranged around the plurality of second tubular portions and faces an inner diameter portion of the coil spring.

(10) The tape cartridge according to (9) above, in which the reel lock member further includes an annular rib that is disposed around the plurality of projecting portions and faces an outer diameter portion of the coil spring.

(11) The tape cartridge according to (9) or (10) above, further including
a reel lock release member that is disposed between the reel lock member and the bottom portion of the reel hub and is capable of causing the reel lock member to move to the lock release position against a biasing force of the coil spring.

REFERENCE SIGNS LIST

1 tape cartridge
2 upper shell
3 lower shell
4 cartridge case
5 tape reel
6 reel hub
12 gear forming wall
13 reel lock member
14 reel lock release member
22 magnetic tape
60 bottom portion of the reel hub
131 first tubular portion
132 second tubular portion
133 projecting portion
134 annular rib
201 first protruding portion
202 second protruding portion

The invention claimed is:

1. A tape cartridge, comprising:
    a tape reel that includes a reel hub having a bottomed cylindrical shape, a tape having been wound on the reel hub;
    a cartridge case that includes an upper shell and a lower shell and rotatably houses the tape reel around one axis, the upper shell including a first protruding portion and a plurality of second protruding portions, the first protruding portion protruding toward a center of a bottom portion of the reel hub, the plurality of second protruding portions being arranged around the first protruding portion, the lower shell being coupled to the upper shell; and
    a reel lock member disposed inside the reel hub, the reel lock member having a first surface and a second surface, the first surface including a first tubular portion and a plurality of second tubular portions, the first tubular portion fitting with the first protruding portion, the plurality of second tubular portions fitting with the plurality of second protruding portions, the second surface being capable of engaging with the bottom portion of the reel hub, the reel lock member being movable in a direction of the one axis between a lock position and a lock release position, the second surface engaging with the bottom portion of the reel hub at the lock position, engagement between the second surface and the bottom portion of the reel hub being released at the lock release position.

2. The tape cartridge according to claim 1, wherein
    each of the first protruding portion and the plurality of second protruding portions has a cylindrical shape, and
    each of the first tubular portion and the plurality of second tubular portions has a rectangular tube shape.

3. The tape cartridge according to claim 2, wherein
    the plurality of second tubular portions includes four tubular portions arranged around the first tubular portion at equal angular intervals.

4. The tape cartridge according to claim 3, wherein
    the first tubular portion has four side surfaces, and each of the four side surfaces forms one corresponding side surface of the four tubular portions.

5. The tape cartridge according to claim 2, wherein
    each of the first protruding portion and the plurality of second protruding portions has the same outer diameter.

6. The tape cartridge according to claim 2, wherein
    the first protruding portion includes a plurality of ribs projecting toward the respective side surfaces of the first tubular portion.

7. The tape cartridge according to claim 6, wherein
    the first tubular portion includes a plurality of protrusions facing the plurality of ribs.

8. The tape cartridge according to claim 1, wherein
    the plurality of second protruding portions each include a tip, wherein each tip has a tapered shape with an angle of 15° or less between a corresponding tip and the direction of the one axis.

9. The tape cartridge according to claim 1, further comprising
    a coil spring that is disposed between the upper shell and the reel lock member and urges the reel lock member to the lock position, wherein
    the reel lock member further includes a plurality of projecting portions that is arranged around the plurality of second tubular portions and faces an inner diameter portion of the coil spring.

10. The tape cartridge according to claim 9, wherein
    the reel lock member further includes an annular rib that is disposed around the plurality of projecting portions and faces an outer diameter portion of the coil spring.

11. The tape cartridge according to claim 9, further comprising
    a reel lock release member that is disposed between the reel lock member and the bottom portion of the reel hub and is capable of causing the reel lock member to move to the lock release position against a biasing force of the coil spring.

* * * * *